US010163567B2

United States Patent
Ahn et al.

(10) Patent No.: US 10,163,567 B2
(45) Date of Patent: Dec. 25, 2018

(54) MULTI-LAYERED ALUMINUM OXIDE CAPACITOR

(71) Applicant: POINT ENGINEERING CO., LTD., Asan-si, Chungcheongnam-do (KR)

(72) Inventors: Bum Mo Ahn, Suwon-si (KR); Seung Ho Park, Hwaseong-si (KR)

(73) Assignee: POINT ENGINEERING CO., LTD., Asan-si, Chungcheongnam-do (KR)

( * ) Notice: Subject to any disclaimer, the term of this patent is extended or adjusted under 35 U.S.C. 154(b) by 62 days.

(21) Appl. No.: 14/816,182

(22) Filed: Aug. 3, 2015

(65) Prior Publication Data

US 2016/0035489 A1 Feb. 4, 2016

(30) Foreign Application Priority Data

Aug. 4, 2014 (KR) .......................... 10-2014-0099882

(51) Int. Cl.
*H01G 4/008* (2006.01)
*H01G 4/26* (2006.01)
(Continued)

(52) U.S. Cl.
CPC ........... *H01G 4/008* (2013.01); *H01G 4/1209* (2013.01); *H01G 4/129* (2013.01); *H01G 4/232* (2013.01); *H01G 4/26* (2013.01); *H01G 4/30* (2013.01)

(58) Field of Classification Search
CPC .......... H01G 4/008; H01G 4/26; H01G 4/232; H01G 4/1209; H01G 4/129; H01G 4/30
See application file for complete search history.

(56) References Cited

U.S. PATENT DOCUMENTS 2,223,173 A * 11/1940 Haase ................. H01G 4/26
361/272
2,703,857 A * 3/1955 Engelhardt ............ H01G 4/26
361/301.1
(Continued)

FOREIGN PATENT DOCUMENTS

JP 61129326 A * 8/1986
JP 61283109 A * 12/1986
(Continued)

OTHER PUBLICATIONS

Chinese Patent Office, Communication dated Jan. 17, 2018 by the Chinese Patent Office in counterpart Application No. 2015104826528.

*Primary Examiner* — David M Sinclair
(74) *Attorney, Agent, or Firm* — Sughrue Mion, PLLC

(57) ABSTRACT

The present invention relates to a multi-layered aluminum oxide capacitor comprising an aluminum substrate; a plurality of aluminum oxide layer formed in at least a portion of on both sides or one side of the substrate with respect to the aluminum substrate; and a plurality of electrode layers formed on the aluminum oxide layers. According to the present invention, manufacturing process is more simplified since $Al_2O_3$ insulation layer is formed by anodizing the aluminum layer without forming an extra insulation layer after forming the aluminum layer, so that the manufacturing cost can be reduced, and also a multi-layered capacitor having a high capacitance and a high reliability can be provided by stacking capacitors comprising a plurality of aluminum oxide layers using a more simplified process according to the present invention.

3 Claims, 2 Drawing Sheets

(51) Int. Cl.
    *H01G 4/12*     (2006.01)
    *H01G 4/30*     (2006.01)
    *H01G 4/232*    (2006.01)

(56) References Cited

U.S. PATENT DOCUMENTS

| | | | | |
|---|---|---|---|---|
| 2007/0188982 | A1* | 8/2007 | Kuriyama | H01G 2/065 |
| | | | | 361/528 |
| 2007/0242418 | A1* | 10/2007 | Hashimoto | H01G 9/012 |
| | | | | 361/530 |
| 2009/0080144 | A1* | 3/2009 | Matumoto | H01G 9/012 |
| | | | | 361/528 |
| 2013/0070385 | A1* | 3/2013 | Harada | H01G 4/30 |
| | | | | 361/301.4 |

FOREIGN PATENT DOCUMENTS

| | | | | |
|---|---|---|---|---|
| JP | 02130907 | A | * | 5/1990 |
| JP | 05101977 | A | * | 4/1993 |
| JP | 06176979 | A | * | 6/1994 |
| JP | 06267801 | A | * | 9/1994 |
| KR | 20170073085 | A | * | 6/2017 |

* cited by examiner

MULTI-LAYERED ALUMINUM OXIDE CAPACITOR

TECHNICAL FIELD

The present invention relates to a multi-layered capacitor, more particularly, relates to a capacitor structure using an aluminum oxide layer.

BACKGROUND ART

Capacitor is used as a battery for storing or discharging electricity, or being utilized for its direct current blocking characteristics, and has a structure wherein a dielectric material is inserted between the two closely placed electrodes which are insulated from each other.

When a direct current is applied to the capacitor, the current starts to flow while the charges are being accumulated in each electrode, but the current stops to flow when the accumulation of the charges are completed. However, if the direct current is applied again after changing the electrodes, the current starts to flow instantaneously. Using such characteristics, the capacitor is used for blocking direct currents but passing the alternate currents, and also it is used for storing electricity.

Such capacitors are classified according to the types of dielectric materials used therein such as air, vacuum, gas, liquid, mica, ceramics, paper, plastic film, electrolyte, and the like.

As for electrolytic capacitors, there are aluminum electrolytic capacitors and tantalum electrolytic capacitors, and electrolytic capacitors generally means aluminum electrolytic capacitors. Electrolytic capacitor uses thin oxide film as a dielectric material and aluminum is used as an electrode material. Since very thin dielectric material can be made, relatively large capacitance can be obtained compared with the volume of the capacitor.

Meanwhile, recently researches on multi-layered ceramic capacitor (MLCC) which is made of alternately stacked ceramic layer and metal (nickel) layer are being actively conducted. A multi-layered ceramic capacitor is made by alternately stacking 200 to 1000 of ceramics layers and metal layers within 0.3 mm height which is a typical thickness of a hair.

A multi-layered ceramic capacitor can store electricity by stacking a plurality of ceramics layers and nickel layers using the principle that nickel conducts electricity since it is a metal, but ceramics cannot conduct electricity.

Multi-layered ceramic capacitors are essential components for the electronic products such as mobile phones, smart phones, LCD TVs, computers, and the like, each requiring several hundreds of MLCCs therein. Miniaturization trends in electronic apparatuses demand MLCCs of smaller in size but having larger capacitance, which require high level technologies.

However, the thickness of such MLCCs become thicker when stacking a plurality of layers, and, moreover, since expensive process equipments are used in continuous stacking of multiple metal layers and insulation layers, thereby increasing manufacturing cost.

SUMMARY OF INVENTION

Technical Problem

An objective of the present invention, to solve the above described technical problems, is to provide a high capacitance capacitor structure which can reduce manufacturing cost by simplifying the manufacturing process thereof.

Yet, another objective of the present invention is to provide a capacitor structure having a high capacitance and a high reliability, and stacking multiple layers can be performed by using a more simple process.

Solution to Problem

To solve the above described technical problems, a multi-layered aluminum oxide capacitor according to one aspect of the present invention includes:

an aluminum substrate;

at least one aluminum oxide layer (which may be an anodized aluminum oxide layer) formed on at least a portion of both sides or one side of the aluminum substrate; and an electrode layer formed on the aluminum oxide layer.

The capacitor may further include a dielectric layer formed on the aluminum oxide layer, wherein the electrode layer is formed on the dielectric layer.

The aluminum substrate may include at least one concavo-convex area having a predetermined pattern on both sides or on one side of the aluminum substrate, the aluminum oxide layer may include a plurality of barrier layers (which may be non-porous layers having no pore therein), and the electrode layer may be formed on the aluminum oxide layer.

A groove having a predetermined depth may be formed at a portion of the aluminum substrate where the aluminum oxide layer is not formed.

The groove may be included in a plurality of grooves, and the plurality of grooves may be formed at at least a portion of the aluminum substrate alternately on one surface and the other surface.

The electrode layer may be included in a plurality of electrode layers, and the plurality of electrode layers may be formed at both sides of the grooves and are bonded together at at least a portion of the aluminum substrate where the grooves are formed.

The capacitor may further include at least one lead portion formed between the electrode layers and configured to apply electricity to the electrode layers which are bonded together.

A multi-layered aluminum oxide capacitor according to another aspect of the present invention includes:

an aluminum substrate having at least one bending portion;

aluminum oxide layers (which may be anodized aluminum oxide layers) formed on at least a portion of both sides of the aluminum substrate such that the aluminum oxide layers are vertically aligned with each other with respect to a surface of the aluminum substrate; and electrode layers formed on the aluminum oxide layers, wherein the electrode layers formed on the aluminum substrate are bonded together.

A multi-layered aluminum oxide capacitor according to another aspect of the present invention includes:

an aluminum substrate having at least one bending portion;

aluminum oxide layers (which may be anodized aluminum oxide layers) formed on at least a portion of both sides of the aluminum substrate such that the aluminum oxide layers are vertically aligned with each other with respect to a surface of the aluminum substrate;

electrode layers formed on the aluminum oxide layers; and at least one lead portion formed between the electrode layers for applying electricity to the electrode layers which are bonded together.

A multi-layered aluminum oxide capacitor according to another aspect of the present invention includes:

an aluminum substrate;

aluminum oxide layers (which may be anodized aluminum oxide layers) formed on at least a portion of both sides of the aluminum substrate such that the aluminum oxide layers are vertically aligned with each other with respect to a surface of the aluminum substrate;

electrode layers formed on the aluminum oxide layers, wherein the aluminum substrate is formed by bending an aluminum sheet material.

The capacitor may further include: a first lead portion connected to the aluminum substrate; and a second lead portion connected to the electrode layer.

The aluminum substrate may include a bending portion having a V-shaped cross-section and may be bent with respect to the bending portion, wherein neither the aluminum oxide layer nor the electrode layer is formed at the bending portion.

The aluminum substrate may include bending portions having a V-shaped cross-section and may be bent with respect to the bending portions, wherein the bending portions are formed alternately at an upper surface and at a lower surface of the aluminum substrate.

Advantageous Effects of Invention

According to the present invention, manufacturing process is more simplified since $Al_2O_3$ insulation layer is formed by anodizing the aluminum layer without forming an extra insulation layer after forming the aluminum layer, so that the manufacturing cost can be reduced, and also a multi-layered capacitor having a high capacitance and a high reliability can be provided by stacking capacitors comprising a plurality of aluminum oxide layers using a more simplified process according to the present invention.

DETAILED DESCRIPTION OF EMBODIMENT

Descriptions hereinafter merely illustrate the basic principles of the invention as examples. Therefore, a person skilled art may implement the principles of the invention and invent various devices included in the concept and the scope of the invention even though it is not clearly explained or illustrated in the description of the present invention. In addition, it should be understood that basically, all the conditional terms and the exemplary embodiments listed in the description of the present invention are clearly intended for the purpose of understanding the concept of the invention, but not limited to the embodiments and the forms especially listed in such a way.

The above described objectives, features, and advantages will become more apparent through the detailed description with reference to the accompanying drawings, accordingly, a person skilled in the art may easily implement the technical spirit of the present invention.

A detailed description of a publicly known prior art related to the present invention will be omitted if determined that it may unnecessarily obscure the gist of the present invention. Hereinafter, a preferred exemplary embodiment according to the present invention will be described with reference to the accompanying drawings.

Figure 1:
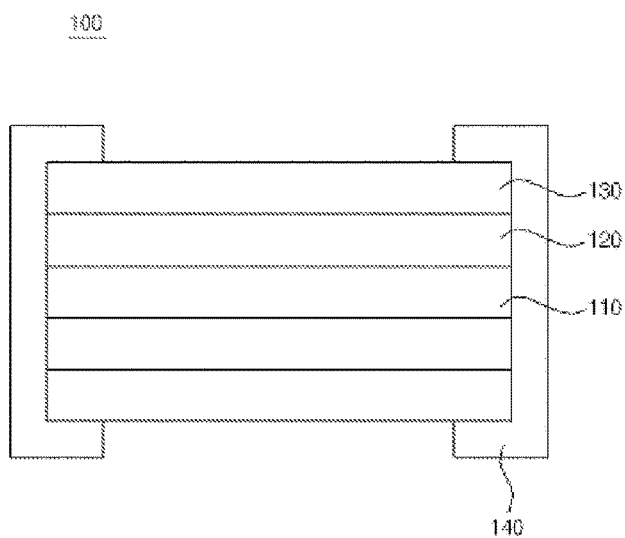
FIGS. 1 to 3 are the drawings illustrating the capacitors comprising a plurality of stacked aluminum oxide layers according to the exemplary embodiments of the present invention.

FIG. 1 is a drawing illustrating the structure of a capacitor comprising stacked aluminum oxide layers (hereinafter referred to as 'multi-layered capacitor') according to an exemplary embodiments of the present invention.

Referring to FIG. 1, a multi-layered capacitor includes an aluminum substrate, a plurality of aluminum oxide layers (which are anodized aluminum oxide layers), a plurality of electrode layers, and plurality of lead portions.

The aluminum substrate according to an exemplary embodiment of the present invention is for forming aluminum oxide layers through the anodizing process, and at the same time, it may also perform capacitor's electrode function as well. In addition, a high capacitance capacitor may be configured by combining a plurality of capacitors utilizing the flexibility of aluminum in a multi-layered structure which will be described later.

Furthermore, an aluminum substrate of the exemplary embodiment may include not only substrates made of pure aluminum but also metal substrates made of various alloys containing aluminum according to the application thereof.

The aluminum oxide layers according to an exemplary embodiment of the present invention are formed at least a portion of the both sides of the aluminum substrate, at the corresponding positions along the vertical direction with respect to the surface of the aluminum substrate. That is, the aluminum oxide layers are vertically aligned with each other with respect to the surface of the aluminum substrate.

The aluminum oxide layer 120 according to an exemplary embodiment of the present invention is formed on the aluminum substrate 110 through the anodizing of the aluminum substrate 110. Although FIG. 1 illustrates forming of the aluminum oxide layers 120 on both sides, the aluminum oxide layers 120 may be formed at least a portion of one side of the aluminum substrate 110 according to the process.

Figure 2:
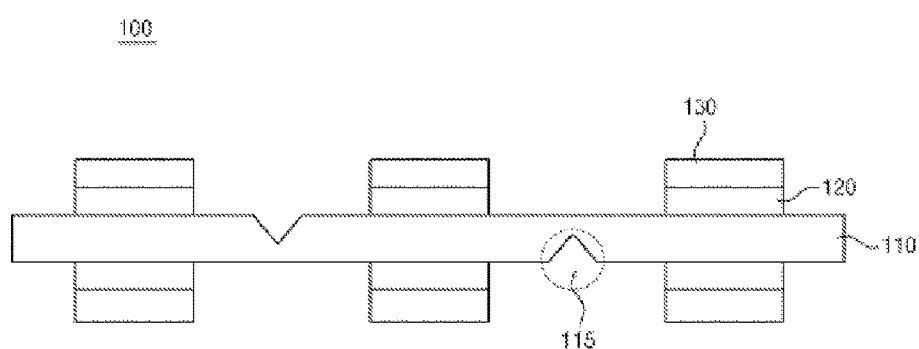

When forming the aluminum oxide layers 120 on both sides of the aluminum substrate 110, the aluminum oxide layers 120 may be formed with a predetermined separation distance at a portion of the aluminum substrate 110, not in the entire surface thereof, as shown in FIG. 2.

If the oxide layers are to be formed on the entire aluminum substrate 110, it is preferable to form the oxide layers on the entire surfaces of the upper and the lower surfaces (of the aluminum substrate), in one side or both sides thereof.

If the oxide layers are to be partially formed, it is preferable to form the oxide layers on both surfaces at the positions of the aluminum substrate 110 corresponding to the vertical direction with respect to the surface of the substrate such that the aluminum oxide layers 120, which are being formed on one surface or on the upper and the lower surfaces with respect to the aluminum substrate 110, are well aligned with each other.

Also, according to an exemplary embodiment of the present invention, the aluminum oxide layer 120 can be formed on at least a portion of the both surfaces of the aluminum substrate 110 spaced apart with a predetermined distance, and at this time, the aluminum oxide layer 120 can be formed at the same location all spaced apart with a predetermined distance on both surfaces of the aluminum substrate 110 as shown in FIG. 2.

Since the aluminum oxide layer 120 according to an exemplary embodiment of the present invention insulates the aluminum substrate 110 from the other metal layer which is bonded to the aluminum substrate 110 (preferably to the aluminum oxide layer 120), it may function as a dielectric layer of the capacitor.

Next, the electrode layer 130 is formed on the aluminum oxide layer 120 according to an exemplary embodiment of the present invention. That is, the aluminum substrate 110 is anodized, and then it (electrode layer) can be bonded to the aluminum oxide layer 120. In other words, in order to enhance the bonding strength between the aluminum oxide layer 120 and the electrode layer 130, the bonding surface may be anodized prior to the bonding process, and a more stronger bonding can be achieved by introducing roughness on the surface which has been anodized in this way.

Further, the aluminum substrate 110 according to an exemplary embodiment of the present invention may further include concavo-convex areas having a concavo-convex pattern, and in this case, the aluminum oxide layer 120 is formed as a barrier layer which is preferably a non-porous layer having no porous therein.

In addition, the multi-layered capacitor 100 according to an exemplary embodiment of the present invention may further include a dielectric layer formed on the aluminum oxide layer. At this time, the dielectric layer may be made of a perovskite material.

Next, the electrode layer 130 according to an exemplary embodiment of the present invention may form an electrode with the aluminum substrate 110. The electrode layer 130 according to an exemplary embodiment of the present invention may be formed with an aluminum which is the same material as the aluminum substrate 110, however, other metals such as a copper and the like may be used in some cases.

The lead portion 140 according to an exemplary embodiment of the present invention applies electricity (i.e., electric voltage or electric current) by being connected to an aluminum substrate 110 or the electrode layer 130.

That is, the lead portion 140 functions as an external electrode, and it may apply electricity to the stacked aluminum substrate 110 or the electrode layer 130. As shown in FIG. 1, the lead portion 140 is provided in a shape which surrounds the both ends of the stacked electrode layer 130, and at the both ends it can be connected to the aluminum substrate 110 and the electrode layer 130.

According to the above configuration, an $Al_2O_3$ insulation layer is formed by anodizing the aluminum layer 120 without forming a separate insulation layer after forming the aluminum layer 120, so that the electrode layer 130 can be formed by bonding a metal layer on the insulation layer, therefore, the manufacturing process is simplified, so that the manufacturing cost can be reduced.

Hereinafter, referring to FIGS. 2 to 3a, a configuration of a higher capacitance multi-layered capacitor 100 will be explained using the configuration of the above described multi-layered capacitor 100 according to FIG. 1.

FIG. 2 illustrates a configuration of a multi-layered capacitor 100 according to another exemplary embodiment of the present invention.

Referring to FIG. 2, a multi-layered capacitor 100 according to another exemplary embodiment of the present invention includes an aluminum substrate 110, an aluminum substrate 110, an aluminum oxide layer 120, and an electrode layer 130.

An aluminum substrate 110 according to an exemplary embodiment of the present invention is provided for forming an aluminum oxide layer 120 through the anodizing process, and at the same time it (aluminum substrate) may perform an electrode function of the capacitor.

Figure 3:
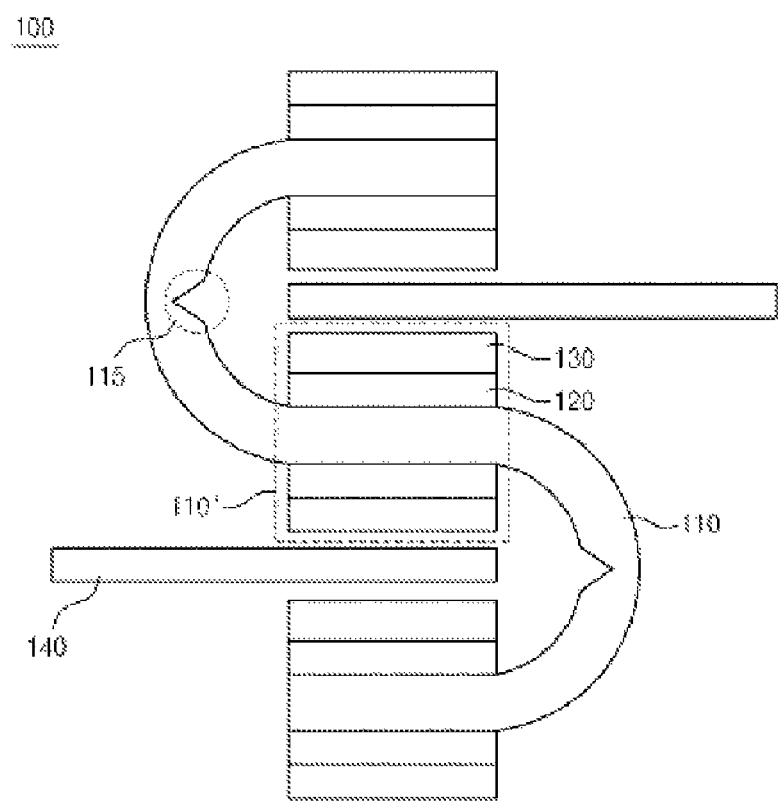

In addition, a multi-layered capacitor 100 according to FIG. 2 configures a high capacitance capacitor illustrated in FIG. 3 by bonding a plurality of capacitors to each other utilizing the flexibility of aluminum in a stacked structure according to FIG. 1

Referring to FIG. 2, the aluminum oxide layers 120 are formed on at least a portion of the both sides of the aluminum substrate 110 at the corresponding positions along the vertical direction with respect to the surface of the aluminum substrate (i.e., the aluminum oxide layers 120 are vertically aligned with each other with respect to the surface of the aluminum substrate), and are spaced apart with a predetermined distance. In each of the partially formed aluminum oxide layers 120, an electrode layer 130 is formed like the configuration according to FIG. 1. In this way, a plurality of unit multi-layered capacitors 100' can be constructed on the aluminum substrate 110.

Again referring FIG. 2, a multi-layered capacitor 100 according to an exemplary embodiment of the present invention, is multiply formed spaced apart with a predetermined distance on a single aluminum substrate 110. At this time, the distance is for bonding the one unit multi-layered capacitor 100' to the adjacent unit multi-layered capacitor 100', and it may vary with the thickness of the unit multi-layered capacitor 100'.

That is, since the bonded unit multi-layered capacitors 100' share one aluminum substrate 110, the unit multi-layered capacitors 110' can be bonded to other unit multi-layered capacitors 110' by utilizing the separation distance.

According to this method, a high capacitance multi-layered capacitor can be constructed without a process wherein insulation layer is successively formed on the metal electrode layer 130, and again, an electrode layer 130 is formed on the insulation layer.

Furthermore, referring to FIG. 2, in a multi-layered capacitor 100 according to an exemplary embodiment of the present invention, a groove 115 having a predetermined depth may be formed in at least a portion of the aluminum substrate 110 wherein no aluminum oxide layer 120 is formed.

In other words, as shown in FIG. 3, the stress applied to the bending area can be reduced by forming a groove having a predetermined depth and thickness considering the bending direction during bonding by utilizing the flexibility of aluminum.

At this time, as shown in FIG. 2, it is preferred that the groove 115 is alternately formed with respect to the one side and the other side of the aluminum substrate 110 at least in a portion of the aluminum substrate 110. That is, when the grooves 115 are successively formed with respect to the aluminum substrate 110, if one groove 115 is formed on the upper side of the aluminum substrate 110, the next groove is formed on the lower side thereof.

That is, it is formed in such a way in order to implement the structure in FIG. 3. And, at this time, bonding between the electrode layers 130 is performed in a way that the electrode layers 130 formed at both sides of the groove 115 with respect to the groove 115 are bonded together.

In addition, at least one lead portion 140 is formed between the electrode layers 130 being bonded together, so that electricity can be applied to the electrode layers 130 being bonded together. That is, referring to FIG. 3, if a flat plate-like metal lead portion 140 is inserted between the electrode layers 130 being bonded together, and followed by bonding (welding) thereof, the lead portion 140 and the electrode layers 130 are bonded together without a separate electrical bonding process such as soldering and the like for the lead portion 140.

A multi-layered capacitor 100 having a structure as shown in FIG. 3 can be manufactured if the electrode layers 130 of the adjacent unit multi-layered capacitors 100' are bonded according to the configuration of the multi-layered capacitor 100 shown in FIG. 2, as described above.

A multi-layered capacitor 100 according to FIG. 3 includes an aluminum substrate 110, an aluminum oxide layer 120, an electrode layer 130, a plurality of grooves 115, and a plurality of lead portions 140.

The aluminum substrate 110 according to an exemplary embodiment of the present invention comprises at least one bending portion and is being bent. Preferably it (aluminum substrate) is being bent in both directions forming "S-shape" in overall, or possibly being more bent so as to form a sinusoidal shape having periodicity as shown in FIG. 3.

The aluminum oxide layer 120 according to an exemplary embodiment of the present invention is formed on a portion of the both sides of the aluminum substrate 110 at the corresponding locations along the vertical direction with respect to the above described bended aluminum substrate 110.

In addition, the electrode layers 130 are formed on the aluminum oxide layer 120, and the facing electrode layers 130 formed on the aluminum substrate 110 are bonded to each other.

Further, the grooves 115 and the lead portions 140 are formed according to the above description with reference to FIG. 2, and the detailed description regarding this matter will be omitted due to overlapping.

According to the present invention, a high capacitance and high reliability multi-layered capacitor 100 can be provided by stacking capacitors comprising aluminum oxide layers 120 using a more simple process. The aforementioned description merely explains the technical ideas of the present invention with reference to the exemplary embodiments, therefore, a person skilled in the art will appreciate that various modifications, changes, and substitutions are possible within the scope without departing form the fundamental characteristics of the present invention.

Therefore, the exemplary embodiments and the accompanying drawings disclosed in the present invention are intended to illustrate the technical ideas of the present invention and not to limit thereof, and the scope of the technical ideas of the present invention is not limited by such exemplary embodiments and the accompanying drawings. The scope of the present invention shall be construed on the basis of the accompanying claims in such a manner that all of the technical ideas included within the scope equivalent to the claims belong to the present invention.

What is claimed is:

1. A multi-layered capacitor comprising:
an aluminum substrate having at least one bending portion;
anodized aluminum oxide layers partially formed on both sides of the aluminum substrate by anodizing the aluminum substrate such that the anodized aluminum oxide layers are vertically aligned with each other with respect to a surface of the aluminum substrate;
metal electrode layers, formed on and in direct contact with the anodized aluminum oxide layers, respectively; and
at least one lead portion formed between the metal electrode layers for applying electricity to the metal electrode layers which are bonded together,
wherein the anodized aluminum oxide layers are not formed at the bending portion, and the anodized aluminum oxide layers function as dielectric layers of the capacitor,
wherein the bending portion comprises a groove having a V-shaped cross-section, and
a peak of the V-shaped cross-section of the groove faces a direction perpendicular to a stacking direction of the multi-layered capacitor.

2. A multi-layered capacitor comprising:
an aluminum substrate;
anodized aluminum oxide layers partially formed on both sides of the aluminum substrate by anodizing the aluminum substrate such that the anodized aluminum oxide layers are vertically aligned with each other with respect to a surface of the aluminum substrate;
metal electrode layers, formed on and in direct contact with the anodized aluminum oxide layers, respectively,
wherein the aluminum substrate includes a bending portion comprising a groove having a V-shaped cross-section and is bent with respect to the bending portion,
wherein the anodized aluminum oxide layers are not formed at the bending portion, and the anodized aluminum oxide layers function as dielectric layers of the capacitor, and
wherein a peak of the V-shaped cross-section of the groove faces a direction perpendicular to a stacking direction of the multi-layered capacitor.

3. The capacitor according to claim 2, wherein the bending portions are formed alternately at an upper surface and at a lower surface of the aluminum substrate.

* * * * *